(12) United States Patent
Wang

(10) Patent No.: US 9,638,309 B2
(45) Date of Patent: May 2, 2017

(54) V-PULLEY MANUFACTURING PROCESS

(71) Applicant: Jinfang Wang, Zhejiang (CN)

(72) Inventor: Jinfang Wang, Zhejiang (CN)

( * ) Notice: Subject to any disclaimer, the term of this patent is extended or adjusted under 35 U.S.C. 154(b) by 311 days.

(21) Appl. No.: 14/397,629

(22) PCT Filed: May 22, 2013

(86) PCT No.: PCT/CN2013/076030
§ 371 (c)(1),
(2) Date: Oct. 28, 2014

(87) PCT Pub. No.: WO2014/048122
PCT Pub. Date: Apr. 3, 2014

(65) Prior Publication Data
US 2015/0121702 A1  May 7, 2015

(30) Foreign Application Priority Data

Sep. 29, 2012 (CN) .......................... 2012 1 0375467

(51) Int. Cl.
*F16H 55/38* (2006.01)
*B23P 15/00* (2006.01)
(Continued)

(52) U.S. Cl.
CPC .............. *F16H 55/38* (2013.01); *B21D 22/16* (2013.01); *B23P 15/00* (2013.01); *F16H 55/36* (2013.01);
(Continued)

(58) Field of Classification Search
CPC ......... B21D 53/261; B21H 1/04; F16H 55/36; F16H 55/38; F16H 55/44; Y10T 29/4946;
(Continued)

(56) References Cited

U.S. PATENT DOCUMENTS 4,664,647 A * 5/1987 Olszewski .............. F16H 55/49
474/166
4,913,689 A * 4/1990 Morishita ................ B21H 1/04
474/170
(Continued)

FOREIGN PATENT DOCUMENTS

CN 101649883 A 2/2010
CN 201753755 U 3/2011
(Continued)

OTHER PUBLICATIONS

English Machine Translation of CN102218509A, Yufeng Zhang (Oct. 19, 2011).*
(Continued)

*Primary Examiner* — Sarang Afzali
(74) *Attorney, Agent, or Firm* — Tim Tingkang Xia, Esq.; Locke Lord LLP

(57) ABSTRACT

A process for manufacturing a V-pulley is disclosed. A metallic cylindrical pulley blank is integrally formed by removing material of a circumferential surface of the pulley blank to form a plurality of circumferential V-belt grooves. The pulley blank is subjected to precision machining and shot blasting to form a rough shot blasting layer on the side surfaces of the V-belt grooves. At least one through hole is axially drilled along a longitudinal central axis of the pulley blank from one axial end to opposite axial end of the shot blasted pulley blank to fluidly connect all of plurality of V-belt grooves followed by mounting and fastening a mold for casting tooth rings at the bottoms of the plurality of V-belt grooves and receiving a metal casting fluid into the plurality of V-belt grooves from one end portion of the through hole to form the tooth rings.

9 Claims, 2 Drawing Sheets

(51) Int. Cl.
  *B21D 22/16* (2006.01)
  *F16H 55/36* (2006.01)
(52) U.S. Cl.
  CPC .......... *Y10T 29/479* (2015.01); *Y10T 29/4946* (2015.01); *Y10T 29/49453* (2015.01)
(58) Field of Classification Search
  CPC ................. Y10T 29/479; Y10T 29/47; Y10T 83/0304–83/0326; Y10T 409/502624; Y10T 409/502788; Y10T 409/502952; B23P 15/00; B26D 3/02; B26D 3/06; B26D 7/086
  See application file for complete search history.

(56) References Cited

U.S. PATENT DOCUMENTS 5,417,617 A * 5/1995 Milton .................. F16H 55/171
                                                          474/205
6,488,604 B1 * 12/2002 Birn ........................ F16H 55/49
                                                          29/892.11
8,267,802 B2 * 9/2012 Kobayashi .............. F16D 3/223
                                                          464/145

FOREIGN PATENT DOCUMENTS

| | | |
|---|---|---|
| CN | 102886649 A | 1/2013 |
| DE | 2437072 A1 | 2/1976 |
| JP | 2-117729 A | 5/1990 |

OTHER PUBLICATIONS

English Machine Tranlsation of KR20110039410A, Sang Chul Jho (Apr. 18, 2011).*
English Machine Translation of CN102886649A, Jinfang Wang (Jan. 23, 2013).*
English Machine Translation of CN101649883B (Nov. 2, 2011).*
Song, Shaoxiu, "Example Analysis for Processing Pulley by Numerical Control Turning." Non-State Science & Technology, Apr. 2011, No. 4, p. 15, CN 53-1125/N.
International Search Report dated Sep. 5, 2013 for Application No. PCT/CN2013/076030.

* cited by examiner

V-PULLEY MANUFACTURING PROCESS

FIELD OF THE INVENTION

The present invention relates to a pulley manufacturing process, and more particularly to a high-transmission-power V-pulley manufacturing process.

BACKGROUND OF THE INVENTION

Power is generally transmitted between a V transmission belt and a pulley through sliding friction. The greater the frictional force, the higher the transmission power. When a frictional force is large, a slippage between the V belt and the pulley becomes less likely. Currently, a V-pulley is formed by casting, and then annealing. Finally, precise machining is performed on the surface of the V-pulley. A V-pulley made by such a method has a desirable smooth side V belt grooves surfaces. However, such a smooth surface has a low friction coefficient, therefore, the transmission power is limited. When high power transmission is desirable, slippage may easily occur between a V belt and a pulley.

Chinese Patent Publication No. CN102218509A discloses a casting mold for a V belt pulley having belt grooves. A pulley is integrally formed by casting, and then subsequent thermal treatment and precise machining are performed to form a pulley. The side surfaces of belt grooves of the pulley have desirable smoothness, but a low friction coefficient. Therefore transmission power is relatively low, and such a belt is likely to slip. Chinese Patent Publication No. CN1301202A discloses a method of manufacturing a multi-V-groove belt pulley. Multiple V grooves are formed into a two-level multi-V-groove belt pulley. In a belt pulley manufactured by this method, the side surfaces of belt grooves have a relatively low friction coefficient, and therefore transmission power is also relatively low and a belt is likely to slip.

SUMMARY OF THE INVENTION

The present invention overcomes deficiencies in existing V-pulleys that the side surfaces of belt grooves have a low friction coefficient, and relatively low transmission power, and slippage is likely to occur between a belt and the pulley. The present invention provides a V-pulley manufacturing process. In a pulley manufactured by using such a process method, the side surfaces of belt grooves have a high friction coefficient, and relatively high transmission power. Slippage is unlikely to occur in between a belt and the pulley, therefore transmission efficiency is high.

To achieve the goals described above, the present invention provides a V-pulley manufacturing process. The V-pulley manufacturing process includes the following steps:
a. forming a cylindrical pulley body;
b. machining V-belt grooves by removing certain portion of outer surface of the pulley blank, and forming several V-belt grooves matching a V belt on the outer wall of the pulley blank;
c. precision machining by removing certain portion of outer surface of the pulley blank and the side surfaces of the belt grooves, and machining allowance, and forming a bright smooth surface on the outer surface of the pulley blank and the side surfaces of the belt grooves; and
d. shot blasting by placing the pulley in a shot blasting machine, starting the shot blasting machine to perform shot blasting on the side surfaces of the belt grooves to form a rough shot blasting layer on the side surfaces of the belt grooves.

In the first step, a cylindrical pulley blank is integrally formed. In the second step, a number of V-belt grooves are made according to required number of V-pulleys. In this step, a machining allowance is kept after belt grooves have been formed. In the third step, further precise machining is performed on the surface of the pulley blank and the side surfaces of the belt grooves to form a bright smooth surface on the outer surface of the pulley blank and the side surfaces of the belt grooves. After the precise machining of the pulley is completed, an operation of shot blasting is then performed to form a rough shot blasting layer on the side surfaces of the belt grooves. The shot blasting layer has a high friction coefficient. When a number of V belts are disposed in the corresponding belt grooves, the V belts are in contact with the shot blasting layer on the side surfaces of the belt grooves to transmit power through sliding friction. Because the shot blasting layer has a high friction coefficient, a frictional force between the V belt and the shot blasting layer is greater. The great force and torque are transmitted during power transmission of the V belt. The V-belts are unlikely to slip, and therefore transmission efficiency is high. The pulley is especially suitable for applications requiring high power and heavy load.

Preferably, a propelled material used in the shot blasting machine is steel shot. The preferred hardness of steel shot is greater than 40 HRC. The linear velocity of propelling steel shot is not less than 60 m/s. The diameter of steel shot is preferably between 0.3 mm and 1 mm. The duration of shot blasting is between 5 and 10 minutes. The shot blasting machine performs shot blasting processing on the surface of the pulley. Steel is chosen as the propelled shot material used by the shot blasting machine. Steel shot has desirable hardness and has relatively desirable elasticity and fatigue resistance performance, and is therefore durable and has a high reuse rate. The shot blasting quantity of the shot blasting machine is between 150 kg/min and 200 kg/min. The linear velocity of propelling steel shot is positively proportional to the depth of the indentation of the shot blasting layer. The diameter of steel shot is positively correlated to the size of the indentation of the shot blasting layer. The linear velocity of steel shot is not less than 60 m/s. The diameter of steel shot is between 0.3 mm and 1 mm. The duration of shot blasting is between 5 minutes and 10 minutes. Through the settings of these shot blasting process parameters, after shot blasting is completed, the friction coefficient of the shot blasting layer reaches an ideal value.

Preferably, a computer numerical control (CNC) machine tool is used for machining in both the second step and the third step. In the third step, the CNC machine tool performs one time machining to complete both coarse machining and precise machining of the pulley. The CNC machine tool is simple to operate, and the CNC machine tool performs machining once to complete coarse machine and precise machining of the pulley, so that machining steps are simplified, working efficiency is increased, and production cost is reduced.

Preferably, after the fourth step, a through hole is drilled axially on the pulley blank. The through hole penetrates two ends of the pulley blank. The through hole connects all belt grooves. After the through hole has been drilled on the pulley blank, tooth rings are cast: A mold of casting tooth rings is mounted on an outer side of the pulley blank, the tooth rings are cast at the groove bottoms of the belt grooves. Meshing teeth on the tooth rings are designed according to a principle of mesh transmission. The mold is fixed, and a metal casting fluid is poured into the belt grooves from an opening position at an end portion of the through hole to form tooth rings through casting. The tooth rings are cast at the groove bottoms of the belt grooves, meshing teeth are disposed on the outer surfaces of the tooth rings, friction transmission is formed between two side surfaces of the belt grooves and the V belt, and mesh transmission is formed between the meshing teeth on the tooth rings and the V belt. Therefore, a combined transmission manner of friction transmission and mesh transmission is formed between the V belt and the pulley, so that the V belt is unlikely to slip, the force and torque of transmission are far greater than those of transmission of a conventional V belt, and transmission efficiency is high. The pulley is especially suitable for use in applications requiring high power and heavy load. Several axial through holes are opened on the pulley blank, and a mold of casting a tooth ring is then mounted and fixed on the pulley blank. The mold includes bosses fitting the belt grooves. Meshing tooth molds of casting tooth ring meshing teeth are provided on the surfaces of the bosses. The tooth rings are cast between the surfaces of the bosses and the groove bottoms of the belt grooves, and the through holes are connected to cavities between the surfaces of the bosses and the groove bottoms of the belt grooves. After the mold is mounted, casting aluminum melt is poured into the cavities between the surfaces of the bosses and the groove bottoms of the belt grooves from the opening position at the end portion of the through hole. After the tooth rings are cooled in the air, the mold of casting tooth rings is detached. A V-pulley that has both a shot blasting layer having a relatively high friction coefficient on the side surfaces of the belt grooves and meshing teeth at the groove bottoms of the belt grooves is manufactured. When the pulley is in use, the pulley forms a combined transmission manner of friction transmission and mesh transmission, so that overall performance is desirable.

In one embodiment, in the first step, the pulley is formed through casting by using gray iron. Between the first step and the second step, stress-relieving annealing, surface quenching, and low-temperature annealing are performed on the pulley sequentially. In stress-relieving annealing, the pulley is placed in a furnace between 100° C. and 200° C., the temperature of the furnace is increased to between 500° C. and 600° C., and the temperature is kept for 4 hours to 8 hours before air cooling. In surface quenching, the pulley after stress-relieving annealing is placed in the furnace and heated to 850° C. to 870° C., and the pulley is then placed in oil for quenching. In low-temperature annealing, the pulley after quenching is annealed between 150° C. and 250° C. A sand-casting process is used to cast gray iron to form a pulley blank, the pulley blank is taken out after cooling, and stress-relieving annealing, surface quenching, and low-temperature annealing are sequentially performed on the pulley blank. An internal stress of the pulley blank is removed through annealing, so that a fracture phenomenon does not occur easily on the pulley blank. After surface quenching and low-temperature annealing, the hardness and abrasive resistance of the pulley blank are greatly enhanced, so that the service life of the pulley is increased.

In another embodiment, in the first step, the pulley is formed through casting by using alloy steel. Between the second step and the first step, quenching and low-temperature annealing are performed on the pulley sequentially. In quenching, the pulley is placed in a furnace and heated to 850° C. to 950° C., and the pulley is then placed in oil for quenching. In low-temperature annealing, the pulley after quenching is annealed between 200° C. and 300° C. A sand-casting process is used to cast alloy steel to form a pulley blank, the pulley blank is taken out after cooling, and quenching and low-temperature annealing are performed on the pulley blank sequentially to obtain a martensitic substrate having high strength and high hardness, thereby enhancing the abrasive resistance performance of the pulley and increasing the service life of the pulley. The alloy steel may be one of alloy steel such as low-carbon alloy structural steel, cemented steel, and tempered steel.

Preferably, the diameter of steel shot is around 0.6 mm, and the duration of shot blasting is about 8 minutes. Suitable diameter of steel shot and suitable duration of shot blasting are chosen to make a shot blasting layer to reach an ideal friction coefficient.

Compared with conventional pulley, the beneficial effects of the present invention are: (1) in a pulley manufactured by using such a process method, the side surfaces of belt grooves have a shot blasting layer, the friction coefficient is high, transmission power is relatively high, and slippage is unlikely to occur between a belt and the pulley. Transmission efficiency is high, and the pulley is suitable for use in applications requiring high power and heavy load; and (2) a combined transmission manner of friction transmission and mesh transmission is used between a V belt and a pulley so that slippage is less likely to occur, and the force and torque of transmission are far greater than those of transmission of a conventional V belt.

In the figures: 1. pulley blank, 2 V-belt groove, 3 shot blasting layer, 4. through hole, 5 tooth ring, 6 meshing teeth, 7. connecting hole, 8. key groove.

DETAILED DESCRIPTION OF THE INVENTION

The technical solutions of the present invention are further described in detail below with reference to following specific embodiments and accompanying drawings:

Embodiment 1

Figure 1:
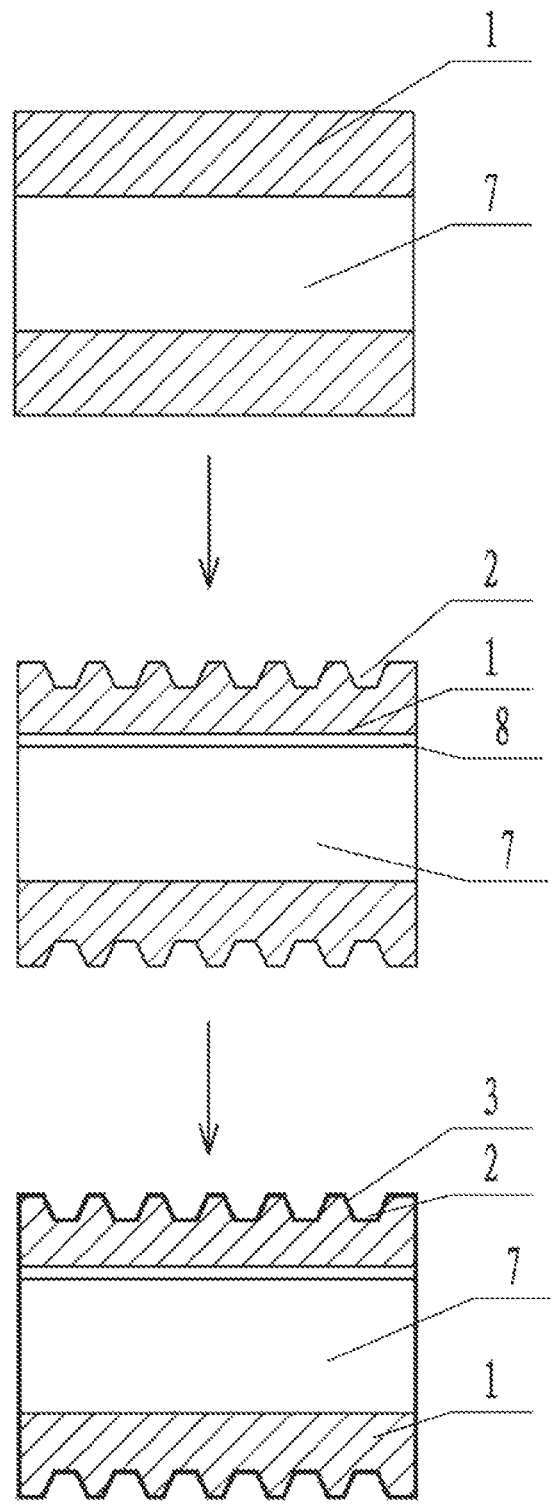
FIG. 1 is a flow chart of a V-pulley manufacturing process according to Embodiment 1 of the present invention.

A V-pulley manufacturing process (referring to FIG. 1). First, a pulley is formed. Gray iron material HT250 is chosen as a casting raw material. A sand-casting process is used for gray iron. The casting material HT250 is heated and melted, and liquid HT250 is poured into a sand cavity through a pouring opening. Once cooled, a cast piece is taken out after the mold is released. The cast piece is an integrally formed cylindrical pulley blank 1. A connecting hole 7 penetrating two ends of the cylindrical pulley blank 1 is drilled to connect a connecting shaft in an axial center of the pulley blank 1. After the pulley blank 1 is cast, stress-relieving annealing, surface quenching, and low-temperature annealing are performed on the pulley blank 1 sequentially. The process of stress-relieving annealing includes: the pulley blank 1 is placed in a furnace at 150° C., the temperature of the furnace is increased to 550° C., the temperature is kept for 6 hours, and then the pulley blank 1 is air cooled. The process of surface quenching includes: the pulley blank 1 after stress-relieving annealing is placed in the furnace and heated to 800° C., and the pulley blank 1 is then placed in oil for quenching. The process of low-temperature annealing includes: the pulley after quenching is placed in the furnace at 200° C. to perform annealing. The process of thermal treatment removes the internal stress of the pulley blank 1, and increases hardness and abrasive resistance of the pulley blank 1 and extends service life of the pulley. Next, V-belt grooves are machined on the outer wall of the pulley blank 1. The pulley blank 1 is held on a CNC machine tool and cutting is performed on the outer surface of the pulley blank 1 to form several V-belt grooves 2 in a shape of a V belt on the outer wall of the pulley blank 1. In certain embodiments, the belt grooves are spaced at a substantially equal distance. Based on the number of V belts required, a corresponding number of V belt grooves are made. A machining allowance is kept after the belt grooves are machined. After the belt grooves have been machined, a key groove 8 is machined inside the connecting hole of the pulley blank 1, and the pulley blank 1 is held in a slotting machine to cut the key groove. After the key groove is made, precise machining is performed on the pulley, and the CNC machine tool is used once again to perform precise machining on the outer surface of the pulley and the side surfaces of the belt grooves, and remove the machining allowance. The CNC machine tool performs machining only once to complete both coarse and precise machining of the pulley. After this machining is completed, a bright smooth surface is formed on the outer surface of the pulley and the side surfaces of the belt grooves. After the precise machining is completed, a drilling operation is performed. The pulley is mounted and fastened on a drilling machine, and six axial fixing holes are drilled in evenly spaced around the connecting hole 7. The axial fixing holes are used for connection and fastening of the connecting shaft and the connecting hole. After the pulley has been drilled, a shot blasting operation is performed on the pulley. A crawler shot blasting cleaner is used for a shot blasting machine. The pulley is placed in the shot blasting machine, and the shot blasting machine performs shot blasting operation on the side surfaces of the belt grooves. For ease of machining, shot blasting is performed on the entire pulley, instead of shot blasting of the side surfaces of the belt grooves only. A propelled material used in the shot blasting machine is steel shot. The hardness of steel shot is greater than 40 HRC. The linear velocity of propelling steel shot is not less than 60 m/s. The diameter of steel shot is about 0.6 mm. The duration of shot blasting is around 8 minutes. After shot blasting is completed, dense indentations are formed on the side surfaces of the belt grooves, and a rough shot blasting layer 3 is formed on the side surfaces of the belt grooves. The shot blasting layer 3 has a high friction coefficient, and a frictional force between the V belt and the shot blasting layer is great. After shot blasting is completed, the pulley is made, packed and warehoused.

Embodiment 2

A V-pulley manufacturing process. The V-pulley manufacturing process resembles that of Embodiment 1 described above referring to FIG. 1. The key differences lie in the selection of a casting material of a pulley blank and the process of thermal treatment associated with the casting material. In this embodiment, alloy steel is chosen to form a pulley blank 1 through casting. The alloy steel may be one of alloy steel such as low-carbon alloy structural steel, cemented steel, and tempered steel. In one embodiment, 16 Mn is used. The pulley blank 1 is cast and then taken out after its mold is released. Thermal treatment processes of quenching and low-temperature annealing are performed in sequence. In the quenching process, the pulley blank 1 is placed in a furnace and heated to 900° C., and then placed in oil for quenching. In the low-temperature annealing process, the pulley blank 1 after quenching is annealed in the furnace at 250° C. A martensitic substrate having high strength and high hardness is obtained, thereby enhancing the abrasive resistance performance of the pulley and extending service life of the pulley. Once the pulley blank 1 is made and thermal treated, steps such as machining of V-belt grooves, precise machining, drilling, and shot blasting are performed, and these processes are almost the same as those in Embodiment 1, and these steps will not be repeated here.

Embodiment 3

Figure 2:
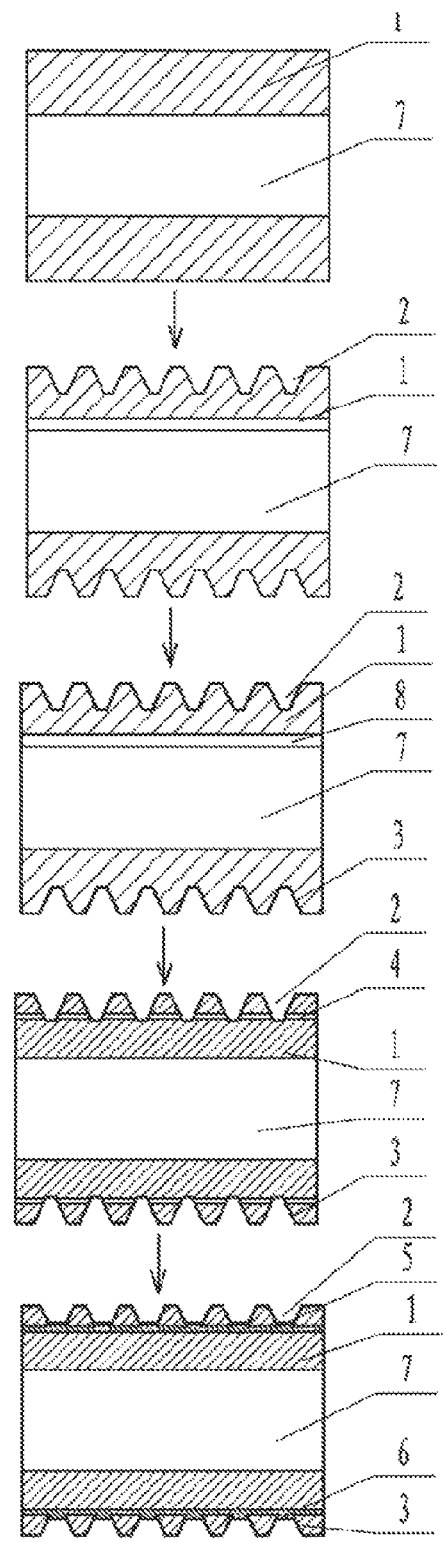
FIG. 2 is a flow chart of a V-pulley manufacturing process according to Embodiment 3 of the present invention.

A V-pulley manufacturing process (referring to FIG. 2) includes all process steps described in Embodiment 1. After a shot blasting process on the pulley is completed, a through hole 4 is drilled axially on the pulley. The through hole penetrates two ends of the pulley. The through hole connects all belt grooves. The axis of the through hole is on an outer side of the groove bottoms of the belt grooves. After the through hole is drilled on the pulley, several tooth rings 5 are then cast. In the casting process, a mold of casting tooth rings 5 is first mounted on an outer side of the pulley, the tooth rings are cast at the groove bottoms of the belt grooves. Meshing teeth 6 are disposed on the outer surfaces of the tooth rings 5, and these meshing teeth 6 on the tooth rings 5 are designed according to a principle of mesh transmission. The mold includes bosses fitting the belt grooves. Meshing tooth molds of casting tooth ring meshing teeth are provided on the surfaces of the bosses. The tooth rings 5 are cast between the surfaces of the bosses and the groove bottoms of the belt grooves. The through holes 4 are connected to cavities between the surfaces of the bosses and the groove bottoms of the belt grooves. After the mold is mounted and fastened, casting aluminum melt is poured into the cavities between the surfaces of the bosses and the groove bottoms of the belt grooves from the opening position at the end portion of the through hole. After the tooth rings 5 are cooled in air, the mold of casting tooth rings is detached, and finally the V-pulley manufacturing process is completed. The V-pulley has both a shot blasting layer having a relatively high friction coefficient on the side surfaces of the belt grooves and meshing teeth at the groove bottoms of the belt grooves. The V-pulley forms a combined transmission manner of friction transmission and mesh transmission, so that overall performance is greatly improved and desirable. The V-pulley may be then packed and warehoused.

Embodiment 4

A V-pulley manufacturing process resembles that of Embodiment 3 described above referring to FIG. 2, and includes all process steps in Embodiment 2. The material used in the casting process of alloy steel is 40Cr. After mold is released, the cast piece undergoes thermal treatments of quenching at 900° C. and high temperature annealing at 580° C. Therefore, a pulley blank with relatively desirable overall performance is obtained. After a shot blasting process on the pulley is completed, a through hole 4 is drilled axially on the pulley. The through hole 4 penetrates two ends of the pulley. The through hole 4 connects all belt grooves.

The axis of the through hole is on an outer side of the groove bottoms of the belt grooves. After the through hole 4 is drilled on the pulley, several tooth rings 5 are cast. In the casting process, a mold of casting tooth rings 5 is first mounted on an outer side of the pulley, the tooth rings 5 are cast at the groove bottoms of the belt grooves. Meshing teeth 6 are disposed on the outer surfaces of the tooth rings, and the meshing teeth 6 on the tooth rings are designed according to a principle of mesh transmission. The mold includes bosses fitting the belt grooves. Meshing tooth molds of casting tooth ring meshing teeth are provided on the surfaces of the bosses. The tooth rings are cast between the surfaces of the bosses and the groove bottoms of the belt grooves. The through hole 4 connects to cavities between the surfaces of the bosses and the groove bottoms of the belt grooves. After the mold is mounted and fastened, casting aluminum melt is poured into the cavities between the surfaces of the bosses and the groove bottoms of the belt grooves from the opening position at the end portion of the through hole. After the tooth rings 5 are cooled in the air, the mold of casting tooth rings is detached, and finally the pulley is packed and warehoused. A V-pulley made according to the present invention has a shot blasting layer with a relatively high friction coefficient on the side surfaces of the belt grooves, and meshing teeth at the groove bottoms of the belt grooves. When this V-pulley is used, the V-pulley performs both friction transmission and mesh transmission, therefore overall performance is desirable.

The foregoing embodiments are only a few preferred embodiments of the present invention. They are by no means intended to limit the present invention to their described embodiments. Other variations and changes are possible without departing from the technical solutions presented in the claims.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A V-pulley manufacturing process, comprising the following steps:

forming integrally a metallic cylindrical pulley blank;

creating a plurality of circumferential V-belt grooves matching a V belt on the pulley blank along a longitudinal central axis by cutting and removing certain portions of a circumferential outer surface of the pulley blank;

precise machining of the pulley blank by further cutting side surfaces of the plurality of circumferential V-belt grooves, removing machining allowance, and forming bright smooth surfaces on all exposed outer surfaces of the pulley blank and the side surfaces of the plurality of circumferential V-belt grooves;

shot blasting the precise machined pulley blank in a shot blasting machine on the side surfaces of the plurality of circumferential V-belt grooves, and forming a rough shot blasting layer on the side surfaces of the plurality of circumferential V-belt grooves, drilling at least one through hole axially on the shot blasted pulley blank along the longitudinal central axis, wherein the at least one through hole penetrates two opposite axial ends of the pulley blank and the at least one through hole fluidly connects all the plurality of circumferential V-belt grooves;

mounting a mold for casting a plurality of tooth rings at groove bottoms of the plurality of circumferential V-belt grooves on an outer side of the pulley blank, wherein meshing teeth on the plurality of tooth rings are designed according to a principle of mesh transmission;

fastening the mold for casting the plurality of tooth rings; and pouring metal casting fluid into the plurality of circumferential V-belt grooves from an opening position at an end portion of the at least one through hole to form the plurality of tooth rings through casting.

2. The V-pulley manufacturing process according to claim 1, wherein a plurality of steel shots are used in the shot blasting machine, a hardness of each of the of steel shots is greater than 40 HRC, a linear velocity of each of the plurality of steel shots is not less than 60 m/s, a diameter of each of the plurality of steel shot is between 0.3 mm and 1 mm, and a duration of the shot blasting is between 5 minutes and 10 minutes.

3. The V-pulley manufacturing process according to claim 2, wherein the diameter of steel shot is about 0.6 mm, and the duration of shot blasting is around 8 minutes.

4. The V-pulley manufacturing process according to claim 2, wherein the shot blasting is performed on an entirety of the pulley blank.

5. The V-pulley manufacturing process according to claim 1, wherein in the forming step, gray iron is cast to form the pulley blank.

6. The V-pulley manufacturing process according to claim 5, further comprising a step of thermal processing the pulley blank after the pulley blank is formed, wherein the thermal processing comprises:

stress-relieving annealing the pulley blank, wherein the pulley blank is placed in a furnace between 100° C. and 200° C., the temperature of the furnace is increased to 500° C. and 600° C., the temperature is kept for 4 hours to 8 hours, and, the pulley blank is air cooled;

surface quenching the pulley blank, wherein the pulley blank after stress-relieving annealing is placed in the furnace and heated to a temperature between 850° C. and 870° C., and the pulley blank is then placed in oil for quenching; and low-temperature annealing the pulley blank, wherein the pulley blank after surface quenching is annealed between 150° C. and 250° C., wherein the stress-relieving annealing, the surface quenching, and the low-temperature annealing are performed on the pulley blank sequentially.

7. The V-pulley manufacturing process according to claim 1, wherein in the forming step, alloy steel is cast to form the pulley blank.

8. The V-pulley manufacturing process according to claim 7, further comprising a step of thermal processing the pulley blank after the pulley blank is formed, wherein the thermal processing comprises:

quenching the pulley blank, wherein the pulley blank is placed in a furnace and heated to a temperature between 850° C. and 950° C., and then in oil for quenching; and low-temperature annealing the pulley blank, wherein the pulley blank after quenching is annealed between 200° C. and 300° C., wherein the quenching and the low-temperature annealing are performed on the pulley blank sequentially.

9. The V-pulley manufacturing process according to claim 1, wherein a computer numerical control machine tool is used in both the creating step and the precise machining step, and the computer numerical control machine tool performs machining once to complete both coarse machining and precise machining of the pulley blank.

* * * * *